June 7, 1949. R. J. FREEMAN 2,472,579
KNOCKDOWN DESK
Filed Oct. 20, 1945 7 Sheets-Sheet 1

INVENTOR.
ROLAND J. FREEMAN
BY Charles A. Morton
ATTORNEY

June 7, 1949. R. J. FREEMAN 2,472,579
KNOCKDOWN DESK
Filed Oct. 20, 1945 7 Sheets-Sheet 5

INVENTOR.
ROLAND J. FREEMAN
BY Charles A. Morton
ATTORNEY.

June 7, 1949.　　　　R. J. FREEMAN　　　　2,472,579
KNOCKDOWN DESK

Filed Oct. 20, 1945　　　　　　　　　7 Sheets-Sheet 6

INVENTOR.
ROLAND J. FREEMAN

BY Charles A. Morton

ATTORNEY.

June 7, 1949.  R. J. FREEMAN  2,472,579
KNOCKDOWN DESK
Filed Oct. 20, 1945  7 Sheets-Sheet 7

INVENTOR.
ROLAND J. FREEMAN
BY
Charles A. Morton
ATTORNEY

UNITED STATES PATENT OFFICE 2,472,579

KNOCKDOWN DESK

Roland J. Freeman, Baldwin, N. Y.

Application October 20, 1945, Serial No. 623,505

12 Claims. (Cl. 45—6)

This invention relates to furniture constructed partly of metal and partly of wood or other non-metallic materials, such as plastics, so that while, when the article of furniture is completely assembled, its load-bearing elements are made of metal, it may present the outward appearance of an article of furniture made substantially entirely of non-metallic material such as wood. The invention is particularly applicable to office furniture, especially desk furniture.

This application is a continuation in part of my co-pending application Serial No. 500,898, filed September 2, 1943, now Patent No. 2,387,506, dated October 23, 1945.

Office furniture, particularly desks, are awkward to handle and take up a great deal of space when shipped or stored in assembled condition.

One object of this invention is a desk or other analagous article of furniture made of pre-fabricated parts which can be shipped to an assembly point and there stored in knock-down condition for subsequent assembly into desk furniture as and when required, thus substantially reducing the amount of space which would be needed if the parts were assembled into desks and then shipped or placed in storage.

Another object is a desk made of pre-fabricated parts which can be exported in knock-down condition so as to utilize shipping space to maximum advantage to reduce freight charges to a minimum, which desk can nevertheless be readily assembled at an overseas destination without the need of highly skilled labor.

Another object is the reduction of the risk of damage from handling.

Another object is a substantial reduction, in the inventory of raw material normally required to be kept on hand, in the amount and type of machinery normally required to convert the raw material into parts for the knock-down units, and the conservation of assembly and storage space, thus effecting a drastic reduction both in original capital outlay and in factory overhead.

Another object is to eliminate a substantial portion of the skilled labor which is normally required in the manufacture of desk furniture of conventional construction.

Another object is a standardized pre-fabricated frame member forming the basic pre-assembly unit of the load-bearing frame assembly for a desk pedestal, said basic pre-assembly unit including all of the essential stationary load supporting parts consisting of metallic bars having any necessary holes pre-punched therein, each bar being fashioned into a definite shape according to its ultimate function in the desk pedestal, said shaped bars being correlated in their proper relative positions according to ultimate function, and then spot welded or otherwise interlocked to complete the pre-fabricated basic pre-assembly unit which is adapted to be stacked in a pile for shipment or storage, and when brought into proper association with another similar unit the pre-punched holes will indicate the correct locations for attaching the pre-fabricated cross-braces, so as to automatically square up the various parts into the load-bearing frame assembly for a desk pedestal when the said parts are rigidly bolted or otherwise secured together.

Another object is to utilize one or more horizontally spaced metallic load-bearing beams so disposed as to support the vertically disposed load-bearing channelled columns and the entire load of the desk pedestal and its contents, carried by the said channelled columns.

Another object is an all metal frame assembly which may be enclosed with non-load-bearing panels secured to said frame assembly in any preferred manner whereby the panels do not carry any portion of the load of the desk pedestal unit but merely serve to enclose it.

Another object is a desk construction wherein the closure panels may be removed and replaced at will.

Specific objects of this invention are a line of practical desk furniture; wherein metallic, and non-metallic materials, such as wood, are so combined in the desk assembly as to give the resulting article the load-bearing strength of metal, with the eye-appearance of wood or of such other non-metallic materials as might be exteriorly used; which, by variously combining a relatively limited number of standardized parts, can be produced in various designs and sizes; and which may utilize interchangeable basic pre-assembly units, standardized according to size of drawer or character of desk pedestal to constitute the load-bearing frame assembly for the assembled desk, thus eliminating the conventional corner posts.

Other objects will appear from the detailed description.

In the drawings comprising seven sheets of twenty-eight figures, numbered Figs. 1 to 28 inclusive, certain embodiments illustrative of the invention are set forth.

Like reference characters designate corresponding parts throughout the several figures of the drawings.

The invention is embodied, by way of example, in an office desk 10 (Figs. 12 and 16) having the usual top 11, supported upon a pair of spaced desk pedestals 90, each pedestal unit 90 containing one or more single drawers 15. Either unit 90 may include a conventional double drawer 18.

Figure 1:
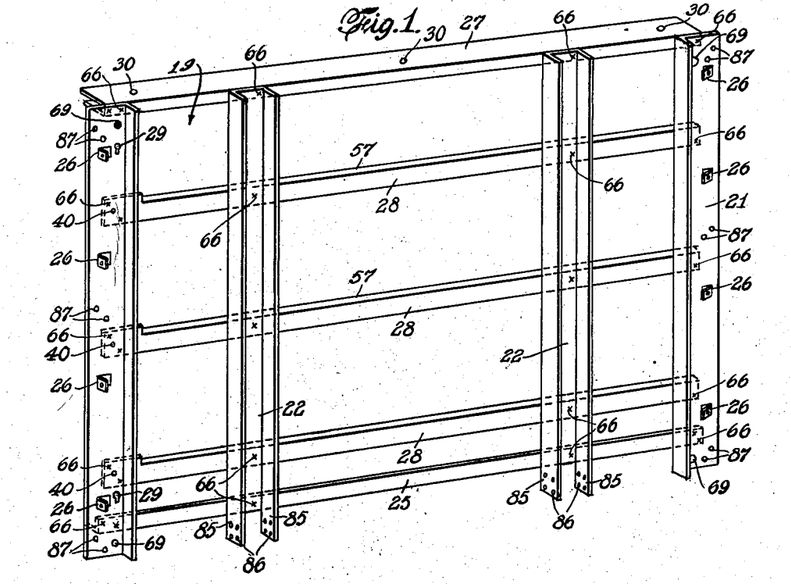
Fig. 1 is a perspective view of a pre-fabricated frame member or basic pre-assembly unit.
Figure 2:
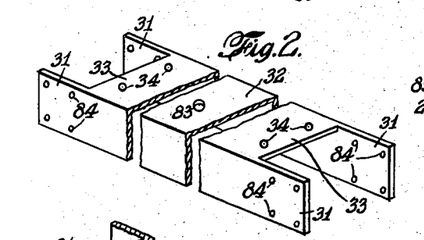
Figs. 2, 3, 4, 5 and 6 are perspective views showing various details of construction of the frame member and of the load bearing frame assembly.
Figures 3, 5:
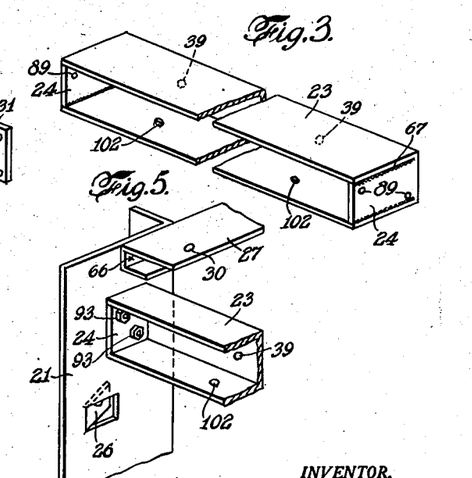

Each desk pedestal 90 includes a load-bearing frame assembly 20 (Figs. 7, 8 and 9) consisting of two pre-fabricated frame members 19 (Fig. 1). Each frame member 19 constitutes the basic pre-assembly unit. These units are purposely designed so that two of them may be assembled in spaced relation, by means of a plurality of cross braces 23 (Fig. 3) and supported and further cross braced by one or more load-bearing cross beams 32 (Fig. 2). By channelling the cross braces and cross beams the risk of buckling or breakage will be substantially diminished. A sled 13 (Figs. 18 and 16) supports two load-bearing beams 32 to elevate the load-bearing frame assembly 20 and the desk pedestal 90 above the floor level. All parts of the desk and the desk load are either directly or indirectly supported by the channelled columns 22 of the load-bearing frame assembly 20. Each pair of oppositely disposed columns 22—22 in turn are supported solely by a load-bearing cross beam 32 (Figs. 2 and 6) which is in direct contact with the sled 13. Hence the weight of the desk and its contents is transmitted directly from the channelled columns 22 of the frame members 19 through the load-bearing cross beams 32 to the sled 13. No part of the deadweight is carried by either the closure panels 12 and 46 or the ornamental corner moldings 47 (Fig. 13), neither of which is designed or intended to be load-bearing.

Figure 12:
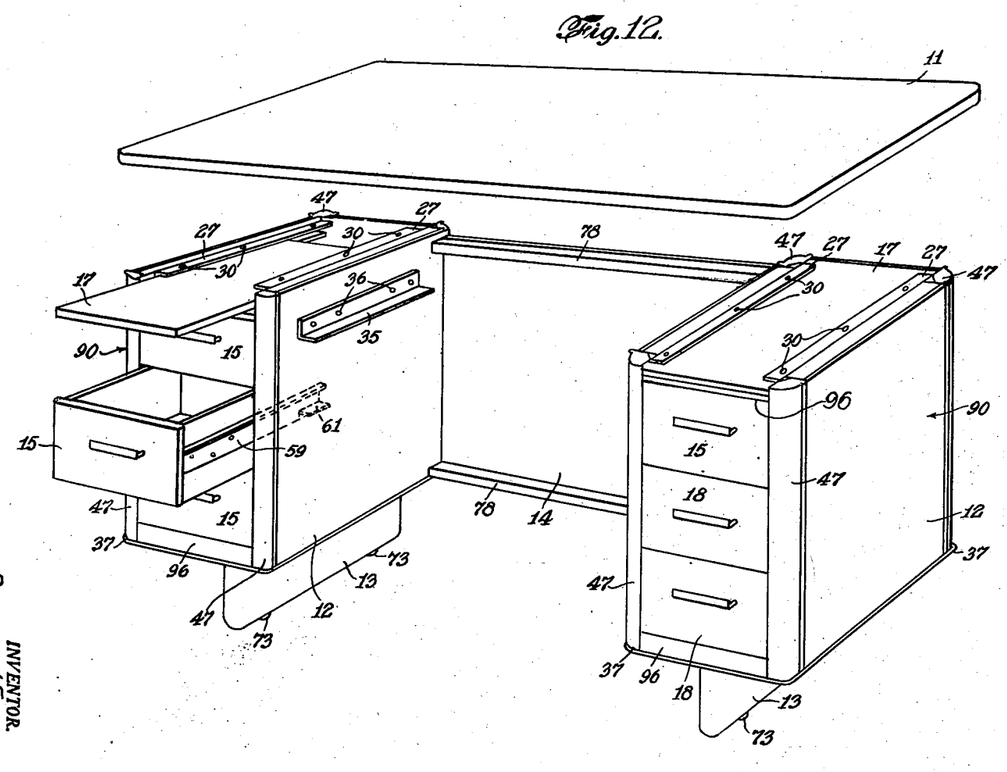
Fig. 12 is a perspective view of a desk assembled in partially exploded form.

Each basic pre-assembly unit 19 (Fig. 1) consists preferably of a series of steel or other metallic bars which are preferably channelled to materially strengthen them. These bars are interlocked together in any preferred manner preferably by welding to form a ladder-like pre-fabricated frame member 19. Each frame member 19 preferably includes two metallic corner plates 21 preferably of angle-steel secured together in spaced relation by means of an L-shaped bottom brace 25 and one or more metallic bars positioned in parallel spaced relation and so shaped as to constitute drawer guides 28—28 whereon the desk drawers 15 and 18 may be slidably mounted. The upper extremities of the corner plates 21 are likewise cross braced by a top plate 27 having a laterally projecting flange containing two or more holes 30 countersunk from below to receive wood screws for retaining the desk top 11 in place. The top plate 27 may be substantially U-shaped in cross section to form a guide channel for slidably receiving an arm slide guide 17 (Fig. 12).

One or more main load-bearing channelled columns 22 is positioned between the corner plates 21. The top plate 27, drawer guides 28—28 and L-shaped side brace 25 are interlocked to the columns 22 in any preferred manner as by spot welding. When spot welding is employed the various metal bars are spot welded at each point of intersection 66—66 to complete the pre-fabricated frame member 19 which constitutes the basic pre-assembly unit (Fig. 1). Each corner plate 21 is provided with two or more pre-punched holed ears 26, and with the pre-punched keyhole slots 29—29, bolt holes 69, 87, and stud holes 40—40, which perform certain useful functions as hereinafter more fully described.

Each channelled column 22 is notched at its lower end (Fig. 1) to form a pair of spaced lugs 85 which may be provided with a series of pre-punched bolt holes 86. Each load-bearing cross beam 32 (Fig. 2) is also notched at each end to form the spaced lugs 31—31 which may be provided with pre-punched bolt holes 84—84 adapted to align with the bolt holes 86 of the lugs 85. Each column 22 and cross beam 32 is so proportioned that the lugs 31—31 of the cross beam 32 engage between the lugs 85 of the channelled column 22, with the end of the notched out portion of the channel 22 engaging the shoulder 33 of the cross beam 32 (Fig. 6), so that the bolt holes 86 in the lugs 85 of channelled column 22 register with the bolt holes 84 in the lugs 31 of cross beam 32 to receive suitable bolts 91 (Fig. 6) for interlocking the channelled column and the cross beam. The bolt holes 86 are preferably countersunk to receive the heads of the bolts 91

(Fig. 6) and the bolts are locked in place by means of suitable nuts 92.

The pre-punched bolt holes 34 in the cross beam 32 register with similar pre-punched bolt holes in the L-shaped bottom brace 25 to receive flat-headed bolts 68 (Fig. 6) thus further cross bracing the frame assembly 20.

Figures 6, 7:
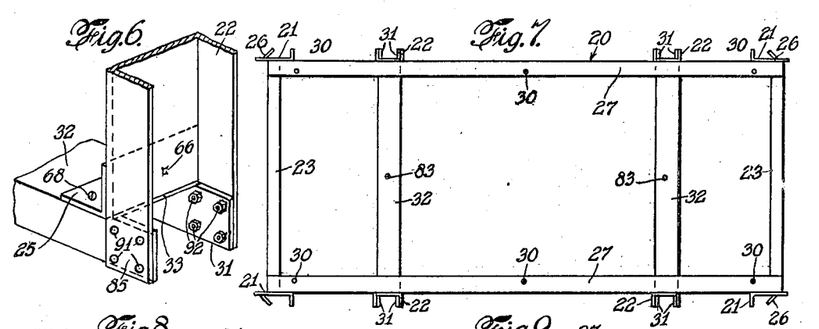
Figs. 7, 8 and 9 are respectively top, front and side views of the frame assembly.
Figure 8:
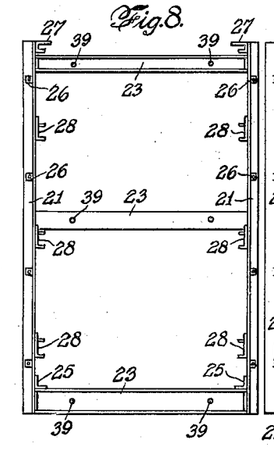
Figure 9:
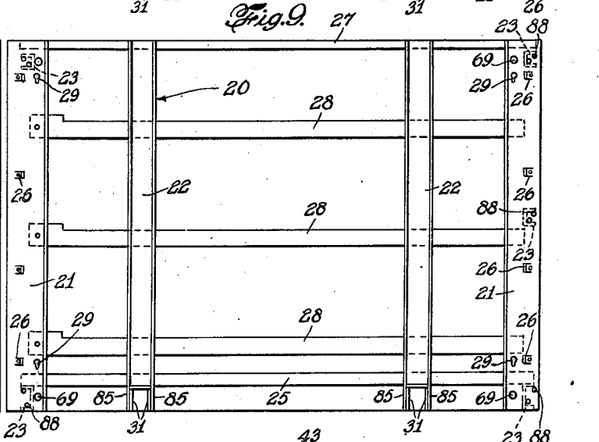
Figure 11:
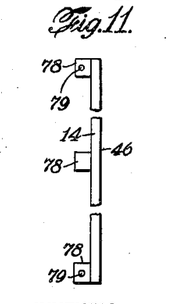
Fig. 11 is an end view of a back panel or of a knee space closure panel.

The frame members 19 are cross braced at each end by the channelled cross braces 23 (Fig. 3), which have the return flanges 24 containing the pre-punched holes 39 welded at 67 (Fig. 3) to reinforce and strengthen the cross brace 23, and provide a suitable surface for either attaching or welding the cross braces 23 to the corner plates 21. The bolt holes 39 are spaced to register with the bolt holes 37 in the corner plates 21 to receive the nuts and bolts 33 (Fig. 5) thus utilizing the cross braces 23 to align two frame members 19 in proper position and "square up" the frame assembly (Figs. 7, 8 and 9). The cross braces 23 are provided with pre-punched screw holes 39 (Fig. 5) which are adapted to receive suitable screws for retaining the cleats 78 (Fig. 11) or the ornamental finishing strips 96 (Figs. 12 and 16) which nest in the cross braces 23, in their proper positions.

The frame assembly 20 may be assembled either in an assembly plant or in the field according to local conditions. When welding equipment is available the cross braces 23 and cross beams 32 may be spot welded. But where welding apparatus is not available nuts and bolts, rivets, or other fastening means may be employed for locking the various braces in assembled position. By way of example, nuts and bolts are used in assembling the various parts to form assembly frame 20.

Figure 4:
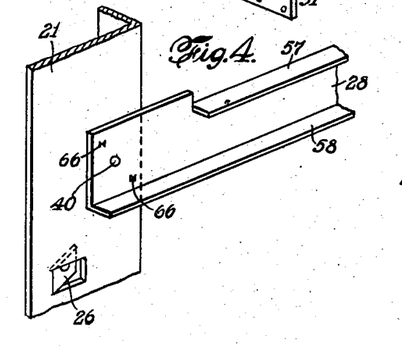
Figure 21:
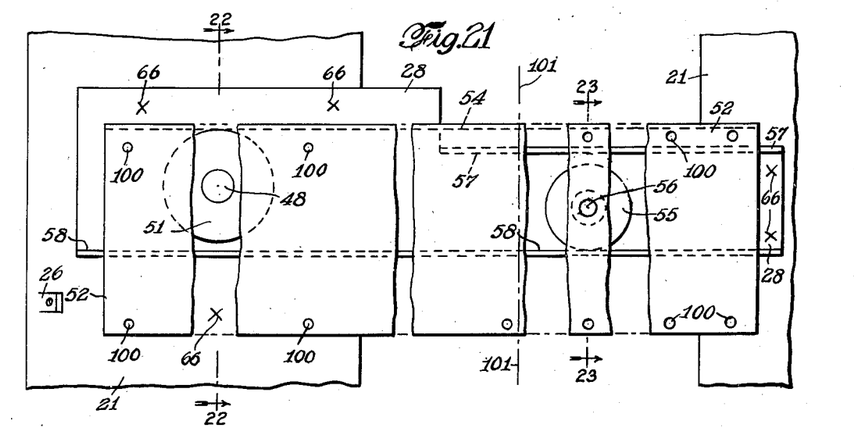
Fig. 21 is a front view of a suitable form of drawer runner and drawer guide assembly for a double or heavily loaded drawer with certain of the parts partially broken away.
Figure 22:
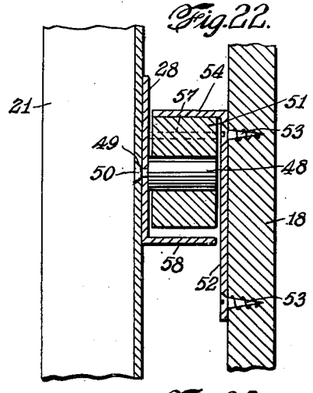
Figs. 22 and 23 are vertical cross sectional views taken along the lines 22—22 and 23—23 respectively of Fig. 21.
Figure 23:
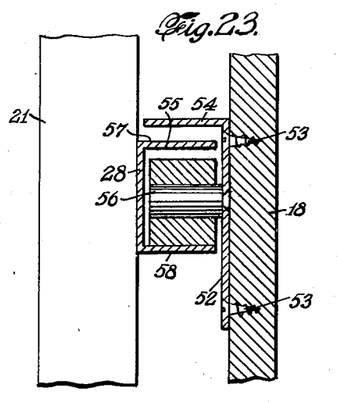

The drawer guides 28 of the pre-fabricated frame members 19 (Fig. 1) are aligned in vertical tier at properly spaced intervals to receive the drawer runners. Each drawer guide 28 includes a stud hole 40 (Fig. 4) which may be pre-punched in the forward end of the drawer guide to receive a stud 48 (Figs. 22 and 21). Each stud may include a shank portion 49 insertable in the stud hole 40 and adapted to be riveted either to the drawer guide 28 or to the corner plate 21 (Fig. 22). When it is desired to rivet the stud 48 to the corner plate 21, the plate is provided with pre-punched stud holes 40 (Fig. 1) arranged at properly spaced intervals to register with the stud holes 40 in the drawer guides. When thus arranged the studs 48 may be riveted in place at any time even after the frame 19 has been pre-fabricated.

Figure 16:
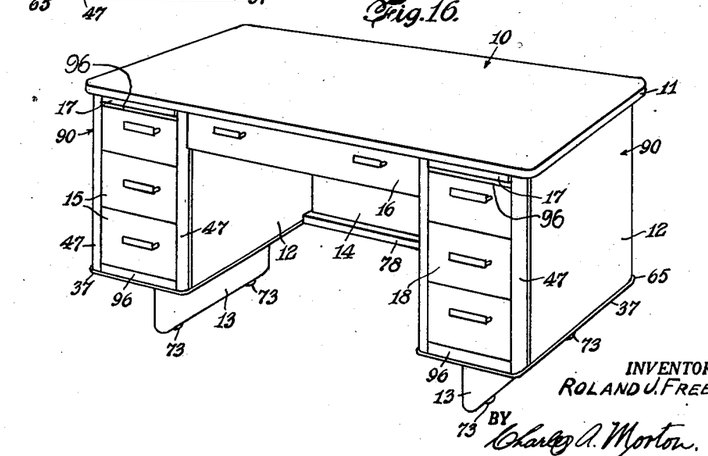
Fig. 16 is a perspective view of one form of the assembled desk.

A roller 51 is detachably mountable upon the stud 48 so that the roller may be used or omitted depending upon the weight of the contents of the desk drawer, or the position of the double drawer 18 in the desk pedestal 90 (Figs. 12 and 16). The rollers 51 may conveniently be employed in conjunction with the double drawer 18 and may sometimes be desirable to facilitate easy operation of the single drawers 15—15, whenever the single drawers are heavily loaded.

One suitable drawer guide construction is illustrated in Figs. 21 and 22 of the drawings. It consists of a metal bar 28, bent at right angles along its lower marginal edge to form the inwardly projecting lateral lower flange 58, and bent at right angles along the rearward portion of its upper marginal edge to form the inwardly projecting lateral upper flange 57. The flanges 57 and 58 in conjunction provide a guideway for the roller 55 of drawer runner 52 (Fig. 21) or for the single drawer runner 59 (Figs. 24 and 25).

The metallic drawer runner 52 (Figs. 21 and 22) is L-shaped in cross section. It is attached to the side of the drawer 15 or 18 in inverted position so that its outwardly projecting lateral flange 54 is slidably supported by the roller 51 which is rotatably mounted relative to drawer guide 28. Wood screws 53 or other suitable means may be used to fasten drawer runner 52 to the wall of the drawer. A roller 55 is rotatably mounted upon a stud 56 which is riveted to the drawer runner 52 in rear of the line 101—101 which indicates the approximate back line of the rear wall of the drawer 18. When the lateral flange 54 of drawer runner 52 is in correct registry with the drawer guide 28, the rear roller 55 is positioned in the guideway formed between the upper and lower flanges 57 and 58 of drawer guide 28. The diameter of the rear roller 55 is slightly less than the distance between the inner faces of the upper and lower flanges 57 and 58, so that the rear roller 55 can not engage both of the flanges simultaneously. As the double drawer 18 is opened the rear roller 55 of drawer runner 52 may engage lower flange 58 of drawer guide 28 while the front roller 51 of drawer guide 28 engages flange 54 of drawer runner 52 to produce a gliding action. When the drawer 18 is opened beyond its center of gravity it pivots on the roller 51 as a fulcrum to tilt the rear end of the drawer upwards until the rear roller 55 engages upper flange 57 of drawer guide 28 to limit the tilting action. Roller 55 now rolls along the inner face of upper flange 57, until its continued forward movement is arrested by the inter-engagement of the rollers 55 and 51. The forward end of the upper flange 57 of the drawer guide 28 (Fig. 21) terminates far enough back of the front roller 51 so that the rear roller can pass between the rear edge of front roller 51 and the front edge of upper flange 57 when the drawer (18 or 15) is lifted to remove it from the pedestal unit 90, thus permitting rear roller 55 to disengage the drawer guide 28. After the drawer has been removed, the front rollers 51—51 may be transferred from their associated studs 48—48, to the studs 48—48 associated with some other pair of drawer guides 28—28 corresponding to some other position in the pedestal unit 90 and the rear rollers 55—55 are brought into registry with flanges 58—58 of the drawer guides 28—28 and the drawer may then be closed.

Figure 24:
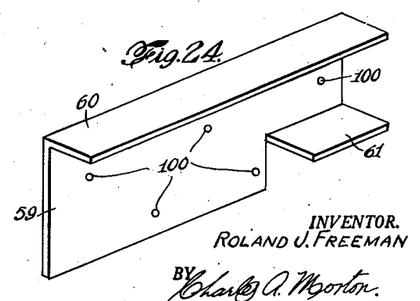
Fig. 24 is a front view of a suitable form of drawer runner for a single drawer.
Figure 25:
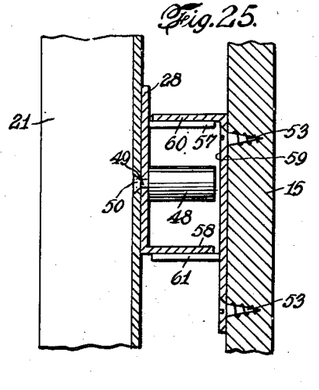
Fig. 25 is a vertical cross sectional view of a fragment of a drawer employing the drawer runner of Fig. 24.

The single drawers 15—15 may either be equipped with drawer guides 28 and drawer runners 52 furnished with front rollers 51—51 and rear rollers 55—55 as illustrated in Figs. 21 and 22, or the rollers 51—51 may be omitted and the drawer runners 52 may be replaced by drawer runners 59—59 embodying the construction illustrated in Figs. 24 and 25. The drawer runner 59 is provided with upper and lower laterally projecting flanges 60 and 61. The upper flange 60 extends substantially throughout the length of the drawer runner, but the lower flange 61 is disposed at the rear end only of drawer runner 59. The upper and lower outwardly projecting lateral flanges 60 and 61 of drawer runner 59 enclose the oppositely projecting lateral flanges 57 and 58 of the drawer guide 28. When the drawer 15 is opened beyond its center of gravity the upper face of lower flange 61 of drawer runner 59 engages the lower face of lower flange 58 of drawer guide 28 to limit the extent of the tilting movement of the drawer. The drawer 15 may be moved from the pedestal unit by opening it until the upper and lower flanges 60 and 61 of the drawer runner 59 disengage the upper and lower flanges 57 and 58 of drawer guide 28.

Each corner plate 21 is provided with two or more punched out holed ears or tabs 26 (Figs. 1, 4, 5, 7 and 13) which are used to anchor the ornamental corner moldings 47 (Fig. 13) in place. The corner moldings 47 may be made of any suitable material such as wood, metal or a plastic composition. The pre-punched bolt holes 69 in the rear corner plates 21 (Fig. 9) accommodate the tie rods 80—80 which connect the left and right pedestal units 90—90 together and anchor the knee-hole panel 14 (Figs. 12 and 13) in place.

Figures 13, 14, 15:
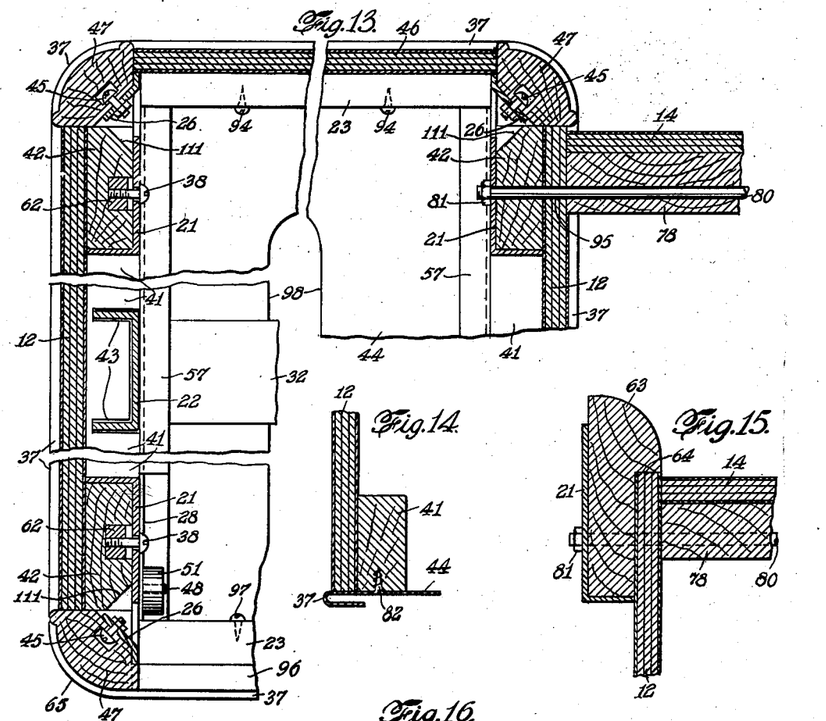
Fig. 13 is a horizontal cross sectional view of a fragment of a desk pedestal and panel assembly showing certain of the parts partially broken away.
Fig. 14 is a vertical cross sectional view of a detail of the dust-proof bottom assembly.
Fig. 15 is a horizontal cross sectional view of a detail of the rear edge of an alternative side panel construction.

The pre-punched keyhole slots 29 in the corner plates 21 (Fig. 1) receive the heads of the bolts or screws 38 (Fig. 10) by means whereof the side panels 12—12 are detachably supported by the load-bearing frame assembly 20 (Fig. 13).

Each pedestal unit 90 may be assembled by mounting two side panels 12 (Fig. 10) and a back panel 46 (Fig. 11) upon the load-bearing frame assembly 20 (Figs. 8, 9 and 13). The panels 12 and 46 may be of any suitable material such as plywood, metal or a plastic composition. The side panels 12 (Fig. 10) may be reinforced by the wooden, metallic or plastic cleats 41 and 42.

Figure 10:
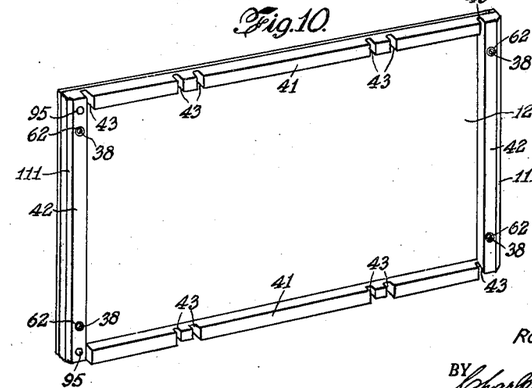
Fig. 10 is a rear view of one form of interchangeable side panel adapted to be detachably secured to the frame assembly.

The horizontal cleats 41 are notched at 43 to register with the flanges of the channelled columns 22 and the corner plates 21. Round headed bolts or wood screws 38—38 are fastened in the vertical cleats 42—42. When the cleats are of non-metallic construction threaded inserts 62 (Fig. 13) may be embedded in the body of the cleats 42—42 to afford better anchorage for the screws 38—38 which are spaced to register in the keyhole slots 29 pre-punched in the corner plates 21. The side panel 12 may be mounted upon the frame assembly 20 by bringing the heads of the screws 38 (Fig. 10) into registry with the keyhole slots 29 of the corner plates 21 and then moving the side panel 12 downwards until the flanges of the screw heads 38 engage the marginal edges of the keyhole slots 29—29 thus locking the side panel in position. The weight of the side panel is transmitted through the corner plates 21 and the L-shaped bottom braces 25—25 to the channelled load-bearing beams 32 which are in turn supported by the sled 13. Back panel 46 (Fig. 11) may likewise be made either of plywood, metal or a suitable plastic material. The back panel is preferably reinforced with horizontally disposed cleats 78—78 which nest in the rear cross braces 23—23 of frame assembly 20. The holes 39 (Fig. 5) located in the back wall of each brace 23 receive suitable screws 94 (Fig. 13) which enter the cleats (Fig. 13) to fasten back panel 46 in place. Vertical cleats 42—42 may be chamfered at 111 to facilitate access to bolts 45 which anchor corner moldings 47—47 to holed ears 26 (Figs. 10 and 13).

The corner moldings 47 may be made of any suitable material, and finished as preferred. They nest in the corner pockets of the pedestal unit and may be fastened in place in any preferred manner. One fastening means consists of a keyway which retains the heads of the bolts 45 (Fig. 13). The bolts 45 are bolted in the holed punchings 26 by drawing up their associated nuts with a socket wrench thus retaining the corner moldings 47—47 in position.

The finishing strips 96 (Fig. 12) nest in the bottom front cross brace 23, and are retained in position by suitable screws 97 inserted through the holes 39 (Fig. 5) of cross brace 23 and fastened in the rear edge of the finishing strip (Fig. 13).

The left and right pedestal units 90—90 are interconnected in spaced relation by means of the knee hole panel 14 (Figs. 11 and 12) and the tie rods 80—80 (Fig. 13). The panel 14 which may be of plywood, metal or any suitable plastic composition may be braced at top and bottom (Fig. 11) by suitable cleats 78 having holes 79 formed therein for receiving the tie rods 80—80 (Fig. 13). The tie rods 80—80 pass through the rod holes 95—95 formed in the rear vertical cleat 42 of the knee hole space side panels 12—12, through the rod holes 69—69 of the corner plate 21 of frame member 19, and are anchored in place by the nuts 81—81 (Fig. 13). As the nuts 81—81 are tensioned upon the tie rod 80 the pedestal units 90—90 are drawn towards the knee hole panel 14 thus bracing the pedestal units 90—90 in position to receive the desk top 11.

The top plates 27—27 which may be U-shaped in cross section to receive arm slide 17 when the desk 10 is to be so equipped, are welded at the upper extremity to each frame member 19 to interbrace the upper extremities of the corner plates 21 and of the channelled columns 22. The holes 30 which are countersunk in the top plates 27—27 from beneath, are adapted to receive suitable flathead screws not shown which are inserted upwards through the countersunk holes 30 and fastened in the bottom of the desk top 11 to anchor the desk top in place.

The center drawer 16 is slidably supported between the pedestal units in any preferred manner as by means of the drawer guides 35 (Fig. 12) which may be attached to the side panels 12—12 at the knee space by means of suitable fastening devices such as the screws 36—36 (Fig. 12).

The dust-proof bottom 44—44 (Fig. 17) may be of wood, metal or other suitable material. When made of wood or plastic the edge of bottom 44 is finished in half-round to form a beaded edge. When made of thin gauge metal the edge of the dust-proof bottom 44 may be rolled or folded over to form the beaded edge 37 (Fig. 14). The corners 65 of the dust-proof bottom 44 are rounded concentric with the radius of the corner moldings 47—47, so that the beaded edge 37 forms an ornamentally finished safety edge at the bottom of the pedestal unit (Fig. 13). The dust-proof bottom may be attached to the base of the pedestal in any suitable manner as by means of screw fasteners 82 (Fig. 14) which pass through suitable holes 110 (Fig. 17) and are anchored in the bottom cleats 41 and 78 of the side and back panels 12 and 46 respectively. Some of the screw fasteners 82 pass through the holes 110 and through the holes 102 in the bottom wall of the cross brace 23 (Figs. 3 and 4) and are anchored in the finishing strips 96 at the front of the pedestal unit. The dust-proof bottom 44 is cut out at 98 (Figs. 17 and 13), to receive the sled 13 (Fig. 18).

Figure 19:
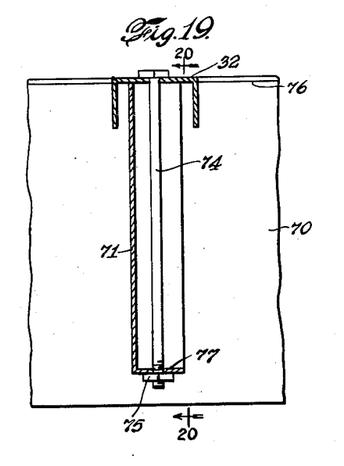
Fig. 19 is a vertical cross sectional view of a fragment of the sled base assembly taken along the line 19—19 of Fig. 20.
Figure 20:
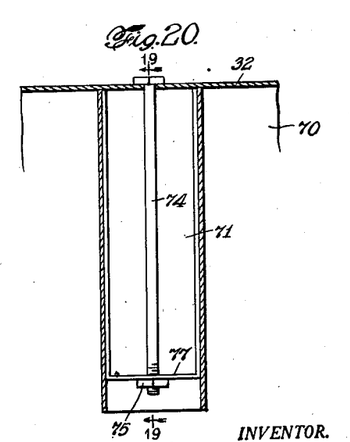
Fig. 20 is a fragmentary vertical cross sectional view taken along the line 20—20 of Fig. 19.

The sled 13 consists essentially of an elongated metallic shell 70 of a suitable gauge sheet metal having its top and bottom edges rolled over to reinforce the shell and form a safety edge 76. One or more channelled steel braces 71 is welded inside the metallic shell 70, and the wall of the shell is slotted at 99 to receive the downwardly extending flanges 100—100 of the channelled cross beam 32. The central tab 77 formed at the lower end of each channelled brace 71 is bent laterally to form a return flange which is welded to the inner walls of the channels of the brace 71 to reinforce the brace and provide suitable means for anchoring the bolt 74, which is passed through the bolt hole 83 of the load-bearing base 32 (Fig. 2) and through a second bolt hole in the welded return flange 77 of the channelled brace 71 (Figs. 19 and 20) and is anchored in place by the nut 75.

Figures 17, 18:
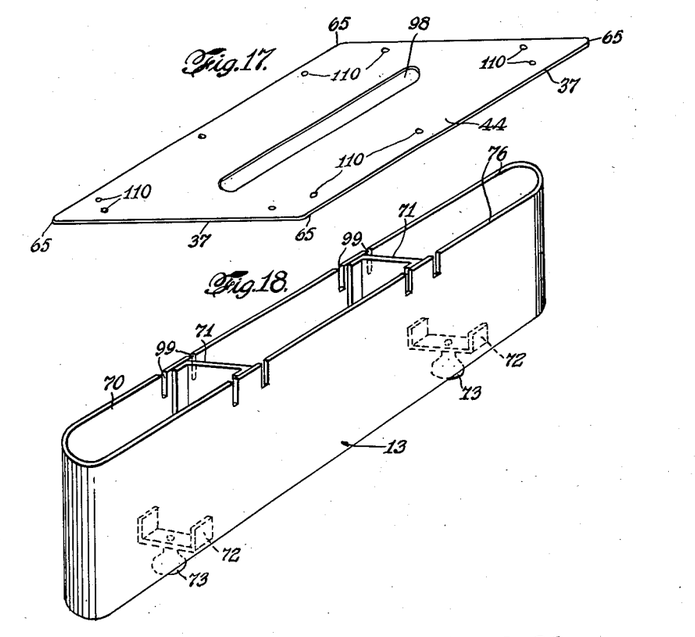
Fig. 17 is a perspective view of a dust-proof bottom.
Fig. 18 is a perspective view of a sled base for supporting the assembled desk above the floor level.

A plurality of U-shaped steel brackets 72 are also welded between the walls of the shell 70 (Fig. 18). Suitable domes or rollers 73 are anchored to the brackets 72. The domes 73 protrude beyond the lower extremity of the metallic shell 70 so that the sled 13 is spaced above the floor level to permit the domes or rollers 73 which support the deadweight of the desk to glide along the floor when the desk is moved.

Figure 27:
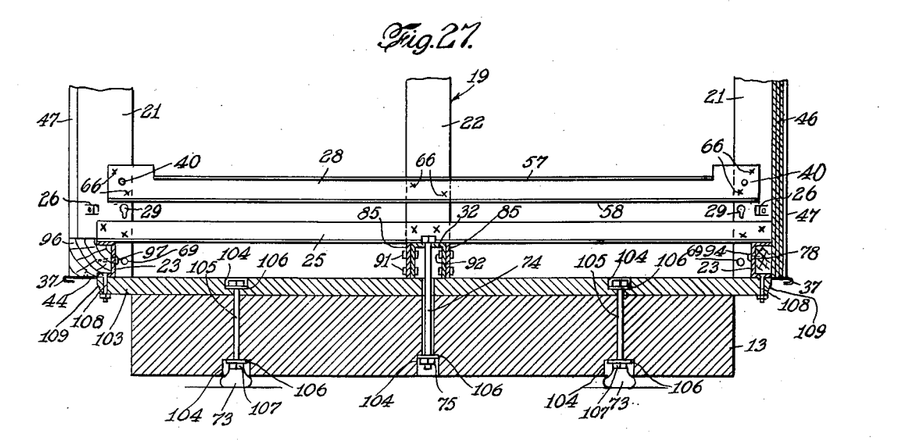
Fig. 27 is a central longitudinal cross sectional view of a frame assembly showing a modified form of the pre-assembly unit and of the sled base mounting.
Figure 28:
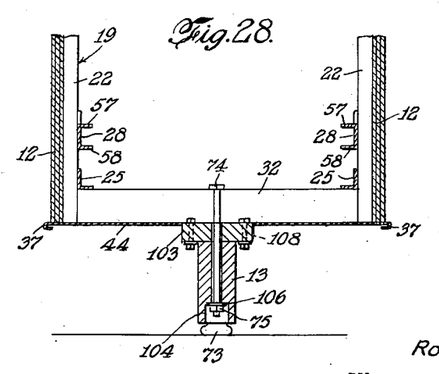
Fig. 28 is a central transverse cross sectional view of the construction of Fig. 27.

When the load-bearing frame assembly 20 employs but a single load-bearing cross beam 32, it may be desirable to modify the method of mounting the desk pedestal unit 90 upon sled 13. One suggested construction is shown in Figs. 27 and 28. The sled 13 is securely attached to a sled plate 103 in any preferred manner as by means of the bolts 105 and their associated nuts 107. The sled 13 may consist of any suitable material, but in the construction shown in Figs. 27 and 28 a wooden sled is illustrated. When made of wood the sled is provided with suitable countersunk holes 104 for the heads of the bolts 105 and for the nuts 107. The nuts and bolts may be provided with suitable washers 106 to prevent the bolt heads and the nuts from injuring the wooden fibres. The sled plate 103 is in turn anchored beneath the cross beam 32 by the bolt 74 and nut 75. The plate 103 extends from front to rear of the frame assembly 20 beneath the bottom cross braces 23—23 and is anchored to the cross braces by suitable nuts and bolts 108—108. The front and rear edges of the sled plate 103 may be reversely bevelled or otherwise shaped at 109—109 to improve the ornamental appearance of sled plate 103.

The domes or glides 73 may be anchored to the bottom of sled 13 in the manner shown in Fig. 18, or they may be female threaded to engage the bolts 105 either in addition to or in substitution for the nuts 107 as shown in Fig. 27.

In order to make the basic pre-assembly unit 19 universal for all positions in the pedestal units 90, it may be equipped with double ended drawer guides 28 (that is, drawer guides having the opposite ends thereof identically formed), as shown in Fig. 27. When thus equipped the frame member 19 becomes a universal pre-assembly unit, adapted for use as either the "left" or the "right" side of the frame assembly 20 of either the "left" or "right" desk pedestal unit 90.

Fig. 15 shows the rear end of a combination side panel and corner construction, wherein the vertical cleats 42 (Fig. 10) are replaced by a corner molding 63 (Fig. 15) having an elongated portion furnished with a recessed seat for the panel 12 and an abutting shoulder 64 forming a flush joint with the edge of the panel 12. The panel may be provided with round headed studs 38 similar to the round headed screws 38 (Fig. 10) for engaging in the key hole slots 29 to detachably attach the side panel 12 and corner molding 63 to the frame assembly 20. The panel 12 and the elongated portion of the corner molding 63 are provided with bolt holes similar to bolt holes 95 (Fig. 10) to receive the tie rods 80 which anchor the knee hole panel 14 in place. This construction will not in any way affect the construction of the back panel 46, or of the knee hole panel 14. This combined side panel and corner construction may be made of wood, metal or plastic composition and may be used interchangeably with the construction illustrated in Figs. 10 and 13.

Figure 26:
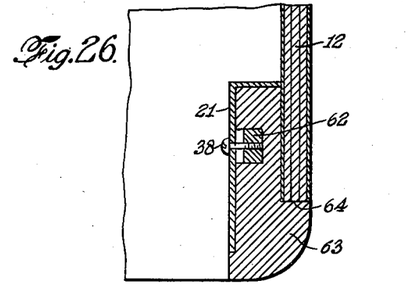
Fig. 26 is a horizontal cross sectional view of a detail of the front edge of the side panel construction of Fig. 15.

Fig. 26 shows the front edge of the combination side panel and corner construction of Fig. 15. The corner molding 63 positioned at the front edge of the side panel 12 is rabbeted to a depth substantially equal to the thickness of the corner plate 21, thus providing a recessed seat for the corner plate and forming an unbroken flush joint constituting an abutment for the side walls of the drawers 15 and 18.

In the alternative construction shown in Figs. 27 and 28 the opening 98 in the dust-proof bottom 44 (Fig. 17) is shaped to accommodate the sled plate 103 shown in Figs. 27 and 28.

What is claimed is:

1. A desk pedestal comprising two separate and distinct pre-fabricated complementary metallic frame members, said frame members being oppositely disposed in spaced relation to partially form a load-bearing frame assembly for the desk pedestal, each of said frame members including a load-bearing main column, drawer guides supported in tier by said main column, and openings pre-punched in said frame member, said pre-punched openings being in alignment with the corresponding openings in said complementary frame member, a beam having a length governed by the width of the desk pedestal, said main columns being erected upon and carried by said beam and secured to the opposite ends thereof to partially cross brace said frame assembly, a plurality of cross braces, said cross braces having pre-punched openings formed in either end thereof registering with certain of the pre-punched openings in said frame members when said frame members are arranged in properly spaced relation and are plumb, square, and level, and means inserted in said pre-punched openings when in correct registry to lock said complementary frame members and said cross braces together to complete said load-bearing frame assembly.

2. A desk pedestal comprising twin complementary metallic frame members, said frame members being oppositely disposed in spaced relation to partially form a load-bearing frame assembly for the desk pedestal, each of said frame members including a load-bearing main column, double ended drawer guides secured in tier to said main column, and openings pre-punched in said frame member, the pre-punched openings in each of said frame members being in alignment, a beam having a length governed by the width of the desk pedestal, said main columns being erected upon and carried by said beam and when secured to the opposite ends thereof partially cross bracing said frame assembly, a plurality of cross braces, said cross braces having pre-punched openings formed in either end thereof which register with certain of the pre-punched openings in said frame members when said frame members are properly spaced, and means associated with said frame members and cross braces when their respective pre-punched openings are in correct registry to lock said frame members and cross braces together to complete the assembly of said load-bearing frame.

3. A frame assembly for carrying the deadweight load of a desk pedestal, said frame assembly comprising two separately pre-fabricated frame members forming the side wall units of the frame assembly and means for cross bracing said wall units to complete the frame assembly, each wall unit as pre-fabricated including two spaced corner plates, a load-bearing column positioned therebetween, and side braces constituting guides for slidably supporting the movable elements of a desk pedestal secured in tier to said corner plates and supported by said main column, said cross bracing means including a main beam extending beneath the bases of the main columns to carry the deadweight load and a plurality of metal bars extending between the corner plates of the wall units, and means for detachably securing the beam to the main columns and the metal bars to the corner plates to complete the frame assembly.

4. A frame assembly for carrying the deadweight load of a desk pedestal, said frame assembly comprising two separately pre-fabricated frame members forming the side wall units of the frame assembly and means for cross bracing said wall units, each wall unit as pre-fabricated including two spaced corner plates, a load-bearing column positioned therebetween and side braces secured in tier to said corner plates and secured to and supported by said main column, certain of said side braces constituting horizontal guides for slidably supporting the movable elements of a desk pedestal, said cross bracing means including a main beam extending crosswise and beneath the main columns to form the load-bearing and supporting base for the frame assembly and a plurality of metal bars extending crosswise and between the corner plates of the pre-fabricated side walls, and means for detachably securing the beam to the main columns and the metal bars to the corner plates to cross brace and complete the frame assembly.

5. A frame assembly for carrying the deadweight load of a desk pedestal, said frame assembly comprising two separately pre-fabricated interchangeable frame members forming the side wall units of the frame assembly and means for cross bracing said wall units to complete the frame assembly, each wall unit as pre-fabricated including two spaced corner plates, a load-bearing column positioned therebetween, and side braces constituting double ended guides for slidably supporting the movable elements of a desk pedestal secured in tier to said corner plates and secured to and supported by said main column, said cross bracing means including a main beam extending beneath the bases of the main columns to carry the deadweight load and a plurality of metal bars extending between the corner plates of the wall units, and means for detachably securing the beam to the main columns and the metal bars to the corner plates to complete the frame assembly.

6. A frame assembly for carrying the deadweight load of a desk pedestal, said frame assembly comprising two separately pre-fabricated interchangeable frame members forming the side wall units of the frame assembly and means for cross bracing said wall units, each wall unit as pre-fabricated including two spaced corner plates, a load-bearing column positioned therebetween and side braces secured in tier to said corner plates and secured to and supported by said main column, certain of said side braces constituting horizontal double ended guides for slidably supporting the movable elements of a desk pedestal, said cross bracing means including a main beam extending crosswise and beneath the main columns to form the load-bearing and suporting base for the frame assembly and a plurality of metal bars extending crosswise and between the corner plates of the pre-fabricated side walls, and means for detachably securing the beam to the main columns and the metal bars to the corner plates to cross brace and complete the frame assembly.

7. A load-bearing frame assembly for a desk pedestal comprising a pre-fabricated frame member constituting one of two similar basic pre-assembly units of the said frame assembly, said basic unit including a load-bearing main column and drawer guides welded in tier to said main column, studs secured to, and projecting laterally from, said drawer guides, and means incorporated in said frame member during fabrication thereof furnishing indicia for facilitating correct correlation of said load-bearing frame assembly.

8. A frame assembly for carrying the deadweight load of a desk pedestal, said frame assembly comprising two separately pre-fabricated side wall units, each side wall unit as pre-fabricated including two spaced corner plates, load-bearing main columns positioned therebetween, lengthwise braces secured in tier to said corner plates and secured to and supported by said main columns, certain of said lengthwise braces constituting drawer guides, studs mounted upon said drawer guides, and indicia for facilitating correct correlation of said wall units, means for cross-bracing said side wall units in properly spaced correlation in said frame assembly, said cross bracing means including, a plurality of main beams, each beam having a shoulder portion at each end thereof for supporting the bases of a correctly correlated pair of main columns, and other cross braces extending between the corner plates of the correlated side wall units, and means for securing said correlated main columns to said main beams and said other cross braces to said correlated corner plates to complete said load-bearing frame assembly.

9. A frame assembly for carrying the deadweight load of a panelled desk pedestal, said frame assembly comprising two separately pre-fabricated side wall units, each side wall unit as pre-fabricated including two spaced corner plates, load-bearing main columns positioned therebetween, lengthwise braces secured in tier to said corner plates and secured to and supported by said columns, certain of said lengthwise braces constituting drawer guides, studs riveted to said drawer guides, and indicia to facilitate correct correlation of said wall units and of said pedestal panels, means for cross-bracing said side wall units in properly spaced correlation in said frame assembly, said cross bracing means including, a plurality of main beams, each beam having a shoulder portion at each end thereof for supporting the bases of a correctly correlated pair of main columns, and other cross braces extending between the corner plates of the correlated side wall units, means for securing said correlated main columns to said main beams and said other cross braces to said correlated corner plates to complete said load-bearing frame assembly, enclosure panels for said pedestal, and means for detachably attaching said panels to said frame assembly.

10. A frame assembly for carrying the deadweight load of a desk pedestal, said frame assembly comprising two separately pre-fabricated frame members forming the side wall units of the frame assembly and means for cross bracing said wall units to complete the frame assembly, each wall unit as pre-fabricated including two spaced corner plates, a main load-bearing column positioned therebetween and side braces constituting drawer guides secured in tier to said corner plates and secured to and supported by said main column, said cross bracing means including a main beam extending beneath the bases of the main columns to carry the deadweight load and a plurality of cross braces extending between the corner plates of the wall units, means for detachably securing the main beam to the main columns and the cross braces to the corner plates to complete the frame assembly, and a base unit positioned beneath the main beam and the lowermost cross braces for elevating the desk pedestal above the floor level.

11. A frame assembly for carrying the deadweight load of a desk pedestal, said frame assembly comprising two separately pre-fabricated side wall units, each side wall unit as pre-fabricated including two spaced channeled corner plates, channeled load-bearing main columns positioned therebetween, lengthwise channeled braces secured in tier to said corner plates and secured to and supported by said channeled columns, certain of said lengthwise braces being channeled to constitute drawer guides, studs riveted to said drawer guides, and indicia for facilitating correct correlation of said wall units, channelling for cross-bracing said side wall units in properly spaced correlation in said frame assembly, said channelling including, a plurality of channeled main beams, each beam having a shoulder portion at each end thereof for supporting the bases of a correctly correlated pair of said channeled columns, and other channeled cross braces extending between the corner plates of the correlated side wall units, means for securing said correlated columns to said main beams and said other cross braces to said correlated corner plates to complete said load-bearing frame assembly, and a sled positioned beneath and fastened to the main beams to elevate the desk pedestal above floor level.

12. A panelled pedestal comprising an all-metallic frame assembly for carrying the deadweight load of the assembled loaded pedestal, said frame assembly comprising two separately pre-fabricated side wall units, each side wall unit as pre-fabricated including two spaced channelled corner plates, channeled load-bearing main columns positioned therebetween, a plurality of braces extending lengthwise between and secured to said corner plates and said main columns, certain of said lengthwise braces being channeled to form drawer guides, studs mounted on said drawer guides, and indicia for facilitating correct correlation of said wall units and of the pedestal panels, channelled cross braces for retaining said side wall units in properly spaced relation in said frame assembly, said channeled cross braces including a plurality of main beams each having a shoulder portion at each end thereof for supporting one of a correctly correlated pair of said main columns and other channelled cross braces extending between the corner plates to further correlate said side wall units, means for securing said correlated columns to said main beams and said channelled cross braces to said correlated corner plates to complete said load-bearing frame assembly, closure panels for said frame assembly, means including keyhole shaped openings formed in the side wall units for detachably hanging said closure panels upon said frame assembly to partially close said pedestal, a sled positioned beneath and fastened to the main beams to elevate the desk pedestal above floor level, and a bottom member fitted to said sled and closing the base of said pedestal.

ROLAND J. FREEMAN.

REFERENCES CITED

The following references are of record in the file of this patent:

UNITED STATES PATENTS

| Number | Name | Date |
| --- | --- | --- |
| 1,840,141 | Vanderhoof | Jan. 5, 1932 |
| 2,011,189 | Anderson | Aug. 13, 1935 |
| 2,387,506 | Freeman | Oct. 23, 1945 |